US007006730B2

(12) United States Patent
Doerr

(10) Patent No.: US 7,006,730 B2
(45) Date of Patent: Feb. 28, 2006

(54) MULTICHANNEL INTEGRATED TUNABLE THERMO-OPTIC LENS AND DISPERSION COMPENSATOR

(75) Inventor: Christopher Richard Doerr, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 125 days.

(21) Appl. No.: 10/387,620

(22) Filed: Mar. 13, 2003

(65) Prior Publication Data
US 2003/0174951 A1   Sep. 18, 2003

Related U.S. Application Data

(60) Provisional application No. 60/364,930, filed on Mar. 15, 2002.

(51) Int. Cl.
  *G02B 6/34*  (2006.01)
(52) U.S. Cl. ............................. 385/37; 385/8; 385/40; 385/41; 359/288
(58) Field of Classification Search .................. 385/8, 385/9, 14, 33, 37, 40, 41; 359/652, 288
See application file for complete search history.

(56) References Cited
U.S. PATENT DOCUMENTS

| | | | |
|---|---|---|---|
| 6,192,177 B1 * | 2/2001 | Amundson et al. | 385/37 |
| 6,275,629 B1 * | 8/2001 | Eggleton et al. | 385/37 |
| 6,427,040 B1 | 7/2002 | Ahuja et al. | 385/37 |
| 6,442,311 B1 | 8/2002 | Barbarossa et al. | 385/37 |
| 6,560,386 B1 * | 5/2003 | Eldada et al. | 385/37 |
| 6,690,855 B1 * | 2/2004 | Thompson et al. | 385/27 |
| 6,778,734 B1 * | 8/2004 | Baldwin et al. | 385/37 |
| 6,807,340 B1 * | 10/2004 | Postolek et al. | 385/37 |

* cited by examiner

*Primary Examiner*—Mark A. Robinson
*Assistant Examiner*—Lee Fineman

(57) ABSTRACT

A thermo-optic lens of the present invention includes a plurality of parallel heating elements having substantially constant center-to-center spacing and respective dimensions varying from the outermost heating elements to the innermost heating elements, and at least two conductive elements for providing a potential across the heating elements. The dimensions of the heating elements are varied such that a parabolic temperature distribution is generated within the thermo-optic lens.

A dispersion compensator of the present invention includes a first and a second waveguide grating, each of the waveguide gratings having a first star coupler, an array of waveguides of increasing path lengths, a first end of each of the waveguides of the array of waveguides optically coupled to the first star coupler, and a second star coupler, a second end of each of the waveguides of the array of waveguides optically coupled to the second star coupler. The dispersion compensator further includes a lens having a parabolic refractive index distribution, the lens optically coupling the second star coupler of the first waveguide grating and the second star coupler of the second waveguide grating.

10 Claims, 7 Drawing Sheets

MULTICHANNEL INTEGRATED TUNABLE THERMO-OPTIC LENS AND DISPERSION COMPENSATOR

CROSS-REFERENCE TO RELATED APPLICATIONS

This patent application claims the benefit of U.S. Provisional Application Ser. No. 60/364,930 filed Mar. 15, 2002, which is incorporated herein by reference in its entirety.

FIELD OF THE INVENTION

This invention relates to the field of dispersion compensators and, more specifically, to tunable dispersion compensators employing a thermo-optic lens.

BACKGROUND OF THE INVENTION

High rate transmission systems, such as 40 Gb/s and higher-rate data systems, have large bandwidths requiring a per-channel dispersion compensator. Advantageous in such high rate systems is that these dispersion compensators be tunable. Various types of tunable dispersion compensators (TDCs) have been proposed, including fiber, bulk-optic, and waveguide-based TDCs.

In the case of fiber TDCS, heat-adjustable chirped fiber Bragg gratings have been implemented for their construction. The fiber TDCs have a large tuning range, but each device may be used for only one or two wavelength channels. They also typically cannot be tuned to zero dispersion and also require a relatively long time to tune (i.e., on the order of seconds).

For bulk-optic TDCs, virtually imaged phased array-based TDCs and Gires-Tournois, interferometers have been implemented for their construction. The virtually imaged phased array TDC has a grating-plus-phase-plate arrangement, previously used to shape ultra-short pulses, with a tilted etalon acting as the grating and a curved mirror as the phase plate. The Gires-Tournois-based TDC's, also previously used to shape ultra-short pulses, are multicavity etalons used two or more in series. Both types of bulk TDC's are used for nearly any wavelength channel (known as "colorless" TDCs), however, both types tune very slowly (i.e., on the order of tens of seconds).

For waveguide-based TDC's, ring-resonators and thermo-optic lens waveguide-grating router (WGR) TDCs have been proposed. Unlike bulk-optic solutions, waveguide-based TDCs may be mass produced, automatically and non-hermetically packaged, tuned quickly (milliseconds), and integrated with other functions. The ring resonator TDC is elegant, extremely compact, and colorless, but requires very high index-step waveguides and several electrical controls. The thermo-optic lens-based TDC is colorless, uses low index-step waveguides, and has only one control, but is less compact.

SUMMARY OF THE INVENTION

The present invention advantageously provides a colorless waveguide-based (integrated) thermo-optic lens and tunable dispersion compensator (TDC) capable of employing low index-step waveguides, having low loss, requiring only one electrical drive signal, having millisecond tune timing and having an increased tuning range.

In one embodiment of the present invention a thermo-optic lens a plurality of parallel heating elements having substantially constant center-to-center spacing and respective dimensions varying from the outermost heating elements to the innermost heating elements, and at least two conductive elements for providing a potential across the heating elements. The dimensions of the heating elements are varied such that a parabolic temperature distribution is generated within the thermo-optic lens.

In another embodiment of the present invention, a dispersion compensator includes a first and a second waveguide grating, each of the waveguide gratings having a first star coupler, an array of waveguides of increasing path lengths, a first end of each of the waveguides of the array of waveguides optically coupled to the first star coupler, and a second star coupler, a second end of each of the waveguides of the array of waveguides optically coupled to the second star coupler. The dispersion compensator further includes a lens having a parabolic refractive index distribution, the lens optically coupling the second star coupler of the first waveguide grating and the second star coupler of the second waveguide grating.

BRIEF DESCRIPTION OF THE DRAWINGS

The teachings of the present invention can be readily understood by considering the following detailed description in conjunction with the accompanying drawings, in which:

FIG. 4b depicts a high level block diagram of the double star of the tunable dispersion compensator of FIG. 1 and the operating principle therein with the thermo-optic lens turned on;

To facilitate understanding, identical reference numerals have been used, where possible, to designate identical elements that are common to the figures.

DETAILED DESCRIPTION OF THE INVENTION

Although various embodiments of the present invention herein are being described with respect to a tunable dispersion compensator implementing a thermo-optic lens, other devices having parabolic refractive index distribution, such as electro-optic lenses using, for example, carrier injection in silicon waveguides, may be implemented within a tunable dispersion compensator of the present invention in place of the thermo-optic lens.

Figure 1:
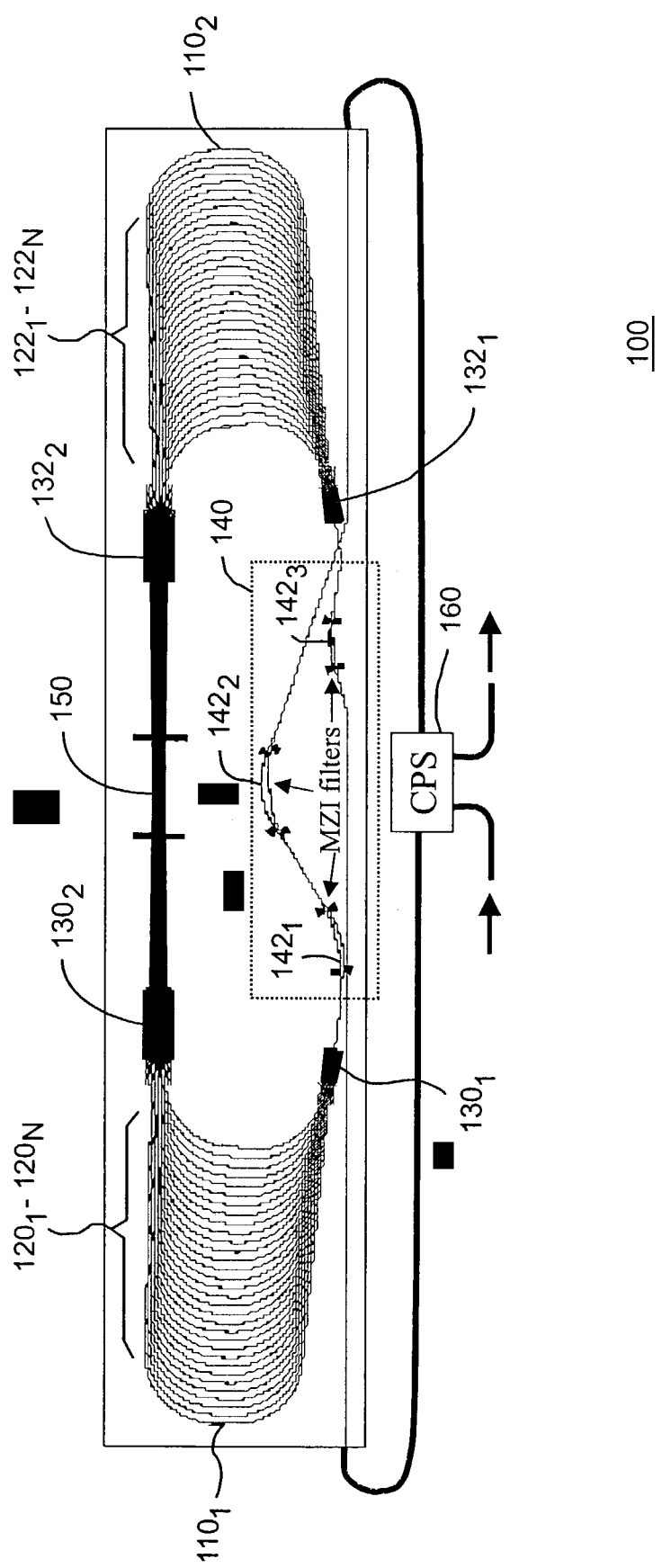
FIG. 1 depicts a high level block diagram of an embodiment of a tunable dispersion compensator in accordance with the present invention.

FIG. 1 depicts a high level block diagram of an embodiment of a tunable dispersion compensator (TDC) in accordance with the present invention. The TDC 100 of FIG. 1 comprises two waveguide grating routers (WGRs) 110₁ and 110₂ (collectively WGRs 110, also known as waveguide gratings), a tunable filter 140, a tunable lens comprising a parabolic refractive index distribution (illustratively a thermo-optic lens) 150, and a circulator/polarization splitter (CPS) 160.

Each of the WGRs 110₁ and 110₂ comprises a plurality of waveguides of increasing path lengths 120₁–120ₙ and 122₁–122ₙ, respectively, (illustratively eighteen waveguides each) (collectively waveguides 120 and 122), and a respective first and second star coupler 130₁, 130₂ and 132₁, 132₂.

The tunable filter 140 comprises, illustratively, three tunable Mach-Zehnder interferometer (MZI) filters 142₁, 142₂, and 142₃. Although in the TDC 100 of FIG. 1 the tunable filter is depicted as comprising three MZI filters, other numbers of MZI filters and other numbers and types of components performing substantially the same function, such as optical equalizers or ring resonators, may be implemented within a TDC for filtering amplified-spontaneous emission (ASE) in accordance with the concepts of the present invention. Furthermore, although the TDC 100 of FIG. 1 is depicted as comprising a CPS 160, a TDC in accordance with the concepts of the present invention may be implemented without a CPS. Similarly, although the TDC 100 of FIG. 1 is depicted as comprising a tunable filter 140, a TDC in accordance with the concepts of the present invention may be implemented without a tunable filter.

The waveguides 120, 122 comprise, illustratively, buried silica cores with an index step of 0.80% and are on a silicon substrate. The TDC 100 consists of two substantially similar high-grating-order WGRs 110 joined together at the ends of their respective second star couplers 130₂ and 132₂. The thermo-optic lens 150 is located in between the joined star couplers 130₂ and 132₂ (the joined star couplers being known hereinafter as the "double star"). The double star is narrowed to the width of a grating diffraction order in its center to extinguish higher diffraction orders. This narrowing causes a small spectral ripple at the diffraction-order edges due to reflections, which is less for transverse-magnetically (TM) polarized light than transverse-electrically (TE) polarized light.

The thermo-optic lens 150 of FIG. 1 consists primarily of an arrangement of metal heaters deposited on its surface. The thermo-optic lens 150 is described in greater detail below with respect to FIG. 2.

To achieve polarization-independence, a polarization diversity scheme is achieved by implementing the optional CPS 160, as depicted in FIG. 1. In such a case, only one polarization of light may be used. Otherwise, in order to achieve a polarization mode dispersion smaller than 0.5 ps, the polarization-dependent wavelength (PDW) shift in the gratings would have to be smaller than 0.5 ps/$D_{max}$, where $D_{max}$ is the largest dispersion value the TDC 100 will accommodate. For example, for the TDC 100 of FIG. 1 having a dispersion tuning range of ±200 ps/nm, the grating PDW would have had to be less than 2.5 pm, which is very difficult to obtain.

The TDC 100 utilizes the optional tunable filter 140 for suppressing amplified-spontaneous emission (ASE) from per-channel optical preamplifiers often required for 40 Gb/s systems. In the embodiment of the TDC 100 of FIG. 1, the three tunable (MZI) filters 142₁, 142₂, and 142₃ of the tunable filter 140 are arranged in series with the following free-spectral ranges: 3200, 1600, and 800 GHz, respectively. The tunable filter 140, as such, has a net free-spectral range of 3200 GHz and a 3-dB bandwidth of substantially 390 GHz.

The TDC 100 of FIG. 1 is capable of providing a dispersion compensation to input optical signals with varying dispersion values in a tunable manner utilizing the tunable lens comprising a parabolic refractive index distribution (illustratively in FIG. 1, the thermo-optic lens 150).

Figure 2A:
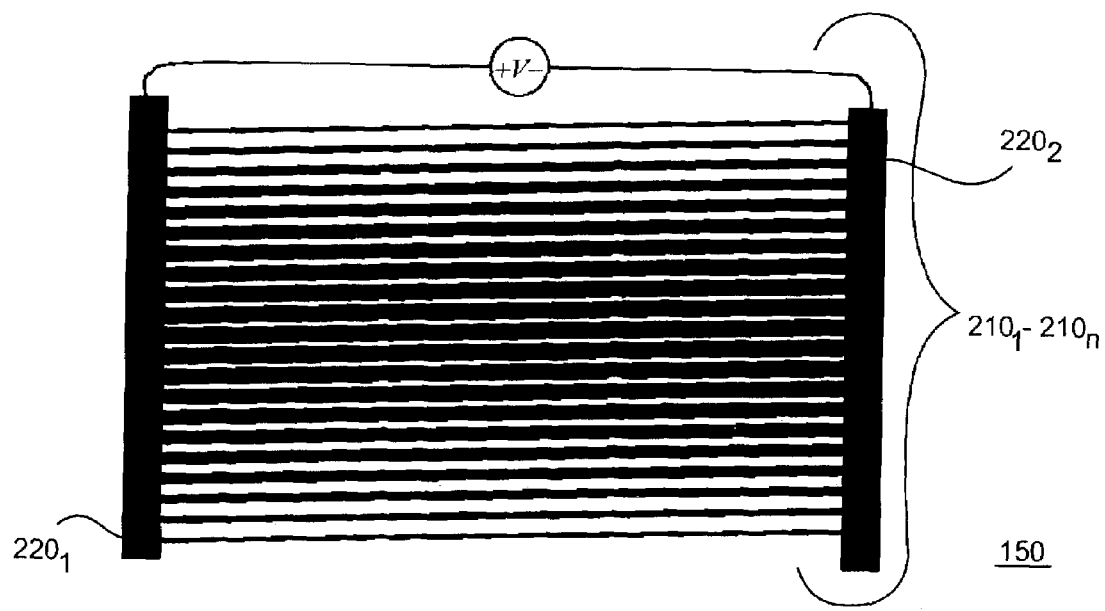
FIG. 2a depicts a high level block diagram of an embodiment of a thermo-optic lens suitable for use in the tunable dispersion compensator of FIG. 1.

FIG. 2a depicts a high level block diagram of an embodiment of a thermo-optic lens, such as the thermo-optic lens 150, suitable for use in the TDC 100 of FIG. 1. The thermo-optic lens 150 of FIG. 2a comprises an array of parallel heating elements 210₁–210ₙ, located between two vertical conductors (potential plates) 220₁ and 220₂. The parallel heating elements 210₁–210ₙ are all of equal length and constant center-to-center spacing, but have varying widths. That is, the heating elements 210₁–210ₙ increase in width as they approach the center of the thermo-optic lens 150 as depicted in FIG. 2a. The configuration of the parallel heating elements 210₁–210ₙ in the thermo-optic lens 150 results in a desired parabolic refractive index distribution (i.e., a parabolic temperature distribution in this embodiment) of the present invention.

Although in FIG. 2a the widths of the heating elements 210₁–210ₙ are depicted as increasing in width as they approach the center of the thermo-optic lens 150, in alternate embodiments of the present invention, the thermo-optic lenses of the above figures may alternatively be configured by reversing the sign of a parabolic function used to determine the lengths or the widths of the heating elements. That is, the widths of the heating elements 210₁–210ₙ may be configured to decrease as they approach the center of the thermo-optic lens 150. Furthermore, the widths of the heating elements 210₁–210ₙ may be configured to increase or decrease uniformly and symmetrically with respect to their relative position in the array of parallel heating elements 210₁–210ₙ or alternatively, the heating elements 210₁–210ₙ may be configured to increase or decrease in a non-uniform and non-symmetrical way to, for example, correct for differences in potential between the heating elements 210₁–210ₙ. The same holds true with respect to the increasing or decreasing of the lengths of the heating elements, described below, with respect to alternate embodiments of a thermo-optic lens of the present invention.

Referring back to FIG. 2a, the thermo-optic lens 150 is configured such that a parabolic temperature distribution is created in the double star. Because the temperature is proportional to the dissipated electrical power per unit area, and the electrical power per heating element is proportional to $V^2w$ (where V is the voltage and w is the heater width), the parabolic temperature distribution is achieved by applying a potential across the array of parallel heating elements 210₁–210ₙ, the varying widths of the parallel heating elements 210₁–210ₙ causing the parabolic temperature distribution. The parabolic temperature distribution of the thermo-optic lens 150 of the present invention, advantageously reduces the maximum lens temperature as compared with prior art lens designs and increases the long-term reliability of the thermo-optic lens 150.

The center-to-center spacing between the parallel heating elements $210_1$–$210_n$ must be relatively small compared to the thermal diffusion width at the core of the thermo-optic lens 150. For example, for a wafer comprising a thermal diffusion core of approximately 80 $\mu$m, a 16 $\mu$m center-to-center spacing between the parallel heating elements $210_1$–$210_n$ may be utilized. Thermal crosstalk between the heating elements $210_1$–$210_n$ actually reduces the total power consumption of the thermo-optic lens 150, so it is preferable to maintain the width of the thermo-optic lens 150 as narrow as possible.

Figure 2B:
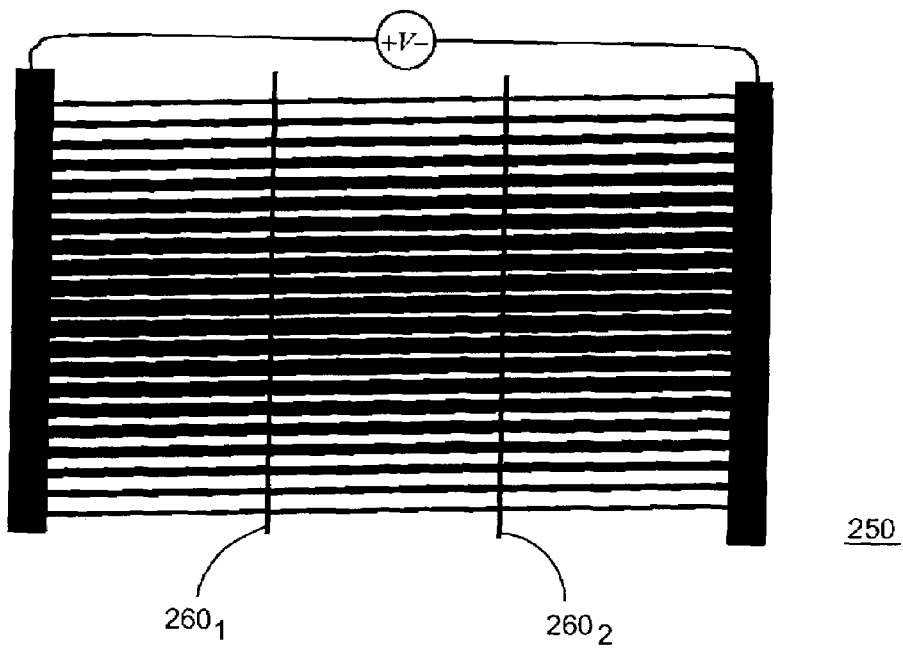
FIG. 2b depicts a high level block diagram of an alternate embodiment of a thermo-optic lens suitable for use in the tunable dispersion compensator of FIG. 1.

FIG. 2b depicts a high level block diagram of an alternate embodiment of a thermo-optic lens suitable for use in the TDC 100 of FIG. 1. In the thermo-optic lens 250 of FIG. 2b, two vertical conductive strips $260_1$, and $260_2$ are added to the thermo-optic lens 150 of FIG. 2a. The two vertical strips $260_1$, and $260_2$ function to maintain the voltage constant along the cross section of the thermo-optic lens 250 and, as such, the lens uniformity is increased. Although in FIG. 2b the thermo-optic lens 250 is depicted as comprising two vertical conductive strips $260_1$, and $260_2$, other numbers of vertical conductive strips may be implemented in a thermo-optic lens of the present invention.

Figure 3A:
FIG. 3a depicts an alternate embodiment of a thermo-optic lens comprising parabolic temperature distribution.
Figure 3B:
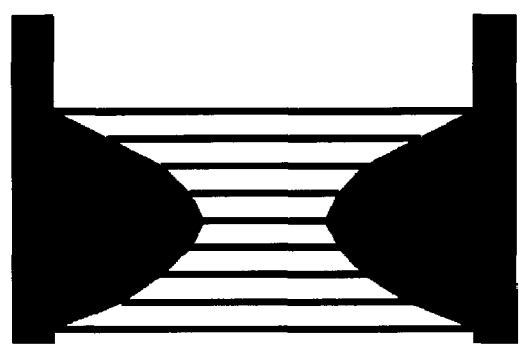
FIG. 3b depicts another embodiment of a thermo-optic lens comprising parabolic temperature distribution.
Figure 3C:
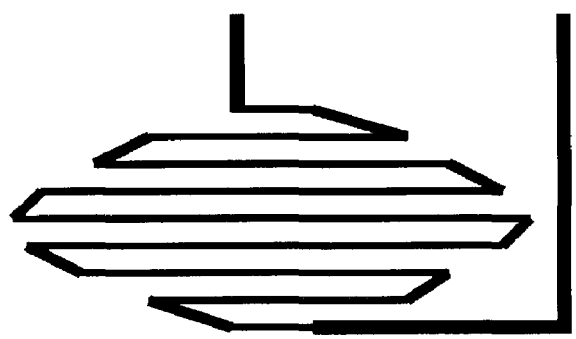
FIG. 3c depicts yet another embodiment of a thermo-optic lens comprising parabolic temperature distribution.

FIGS. 3a–3c depict various other embodiments of thermo-optic lenses in accordance with the present invention. The arrangements of the heating elements of FIGS. 3a–3c also achieve the desired parabolic temperature distribution as in the thermo-optic lens 150 of FIGS. 2a and 2b. For example, in FIG. 3a the widths of the heating elements decrease as they approach the center of the thermo-optic lens.

In the thermo-optic lenses of FIGS. 3b and 3c, the lengths of the heating elements are varied to achieve the desired parabolic temperature distribution. For example, in FIG. 3b the lengths of the heating elements decrease as they approach the center of the thermo-optic lens. As such, the temperature distribution of the thermo-optic lens of FIG. 3b comprises a parabolic distribution.

In FIG. 3c, the lengths of the heating elements increase as they approach the center of the thermo-optic lens. Again, the temperature distribution of the thermo-optic lens of FIG. 3c comprises a parabolic distribution. Although FIGS. 2a and 2b and FIGS. 3a–3c depict various embodiments of a thermo-optic lens in accordance with the present invention, it will be appreciated by those skilled in the art informed by the teachings of the present invention, that various other configurations for the lengths and the widths of the heating elements may be developed for accomplishing a parabolic refractive index distribution in accordance with the present invention. Furthermore, other types of lenses, such as electro-optic lenses using, for example, carrier injection in silicon waveguides, may be configured using the teachings of the present invention to have parabolic refractive index distributions and as such, a TDC of the present invention is not limited to the implementation of a thermo-optic lens.

The inventor further determined that by slightly tilting the thermo-optic lens 150 with respect to an intended optical beam axis, as depicted in FIGS. 2a–2b, when placed in between the double star, refractive index ripples are substantially reduced. The tilting of the thermo-optic lens 150 has a negligible effect on the lens strength, but substantially reduces refractive index ripples formed within the thermo-optic lens 150. That is, when the thermo-optic lens of the present invention is not tilted, the average temperature distribution along the lens contains small ripples due to the heating elements. These ripples cause ripples in the chromatic dispersion of the thermo-optic lens. As such, by tilting the thermo-optic lens with respect to an intended optical beam axis the ripples are substantially reduced. Although a thermo-optic lens in accordance with the present invention may be tilted to reduce refractive index ripples, in an alternate embodiment of the present invention, the heating elements within a thermo-optic lens of the present invention may be constructed at a slight angle with respect to an intended optical beam axis within the thermo-optic lens to constructively perform the above-described tilting while maintaining the orientation of the thermo-optic lens substantially straight in between the double star.

Figure 4A:
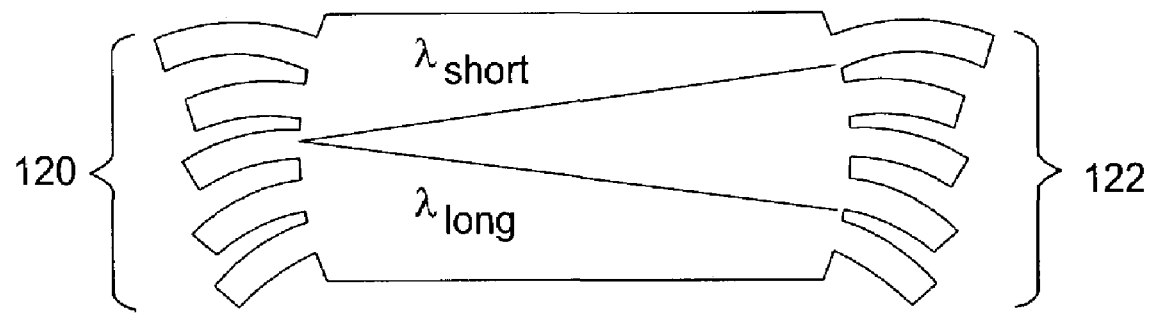
FIG. 4a depicts a high level block diagram of the double star of the tunable dispersion compensator of FIG. 1 and the operating principle therein with the thermo-optic lens turned off.
Figure 4B:
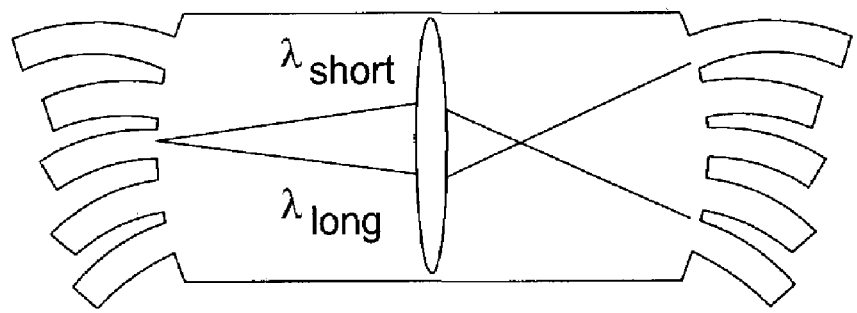

FIGS. 4a and 4b graphically depict the operating principles of the TDC 100 of FIG. 1 with the thermo-optic lens 150 turned off and turned on, respectively. FIG. 4a depicts a high level block diagram of the double star of the TDC 100 and the operating principle therein with the thermo-optic lens 150 turned off (no voltage applied). Within a free-spectral range, the shorter-wavelength light from the left-side WGR $110_1$ is received by the waveguides 122 of the right-side WGR $110_2$ having longer path lengths, and the longer-wavelength light from the left-side WGR $110_1$ is received by the waveguides 122 of the right-side WGR $110_2$ having shorter path lengths. Thus the TDC 100 exhibits negative dispersion. The amount of dispersion during the "lens-off" state is characterized according to equation one (1), which follows:

$$D_0 = -\frac{2Mbc_0}{a(\lambda_0 \Delta f_{FSR})^2} \qquad (1)$$

where M is equal to the number of grating arms, $\alpha$ is the center-to-center spacing between the double-star input waveguides, b is the spatial "channel" width at the double star center (e.g., b=(spatial Brillouin zone width of WGR at the double-star center)/M), $\lambda_0$ is the optical wavelength of interest, $c_0$ is the vacuum speed of light, and $\Delta f_{FSR}$ is the free-spectral range.

FIG. 4b depicts a high level block diagram of the double star of the TDC 100 and the operating principle therein with the thermo-optic lens 150 turned on (voltage applied). When a current flows through the heating elements of the thermo-optic lens 150, the refractive index of the lens is varied by a thermo-optic effect and the focal length of the thermo-optic lens 150 may be varied as such. Accordingly, by controlling the voltage applied, light may be accurately converged at a predetermined position (e.g., specific waveguides 122 of the WGR $110_2$). With the thermo-optic lens 150 turned on, the dispersion increases and becomes positive as the lens strength is increased. The strength of the thermo-optic lens 150 is defined as the phase shift difference between the center of the lens and its top and bottom edges, which is proportional to the thermo-optic power required to drive the lens. The lens strength required to tune the TDC 100 through its dispersion range, $D_0$ to $-D_0$, is characterized according to equation two (2), which follows:

$$\frac{\pi D_0 (\lambda_0 \Delta f_{GDBW})^2}{2c_0} \qquad (2)$$

where $\Delta f_{GDBW}$ is the bandwidth of the linear part of the group delay of the TDC 100 (i.e., $\Delta f_{GDBW}/\Delta f_{FSR}$ is the fraction of the double-star central Brillouin zone occupied by the thermo-optic lens 150).

The 3-dB transmissivity bandwidth at the minimum dispersion (thermo-optic lens 150 power turned off) is characterized according to equation three (3), which follows:

$$\Delta f_{TBW} = \alpha \frac{a}{b} \Delta f_{FSR} \quad (3)$$

where $\alpha$ is a constant that depends on the power distribution in the grating arms and the efficiency shape of the double star's Brillouin zone. $\alpha$ is typically in the range of 0.28.

In one embodiment of a thermo-optic lens in accordance with the present invention, the design parameters for a convex thermo-optic lens are chosen such that when the thermo-optic lens is turned off, the dispersion is at the negative end of the usable range. As such, the thermo-optic lens is able to tune over the entire dispersion range by varying the strength of the thermo-optic lens.

In a thermo-optic lens according to the present invention, the temperature of the heating elements is higher than that of the core of the thermo-optic lens. Thus, to minimize the temperature of the heating elements and ensure long-term reliability, the thermo-optic lens should be made as long as possible keeping in mind that the length of the thermo-optic lens is limited by equation four (4), which follows:

$$l << \frac{2Mb^2 n}{\lambda_0} \quad (4)$$

where M is equal to the number of grating arms, b is again the spatial "channel" width at the double star center, $\lambda_0$ is the optical wavelength of interest and n is the refractive index of the waveguides 120, 122 of the TDC 100.

In addition the resistance change in the heating elements with increasing temperature must be considered. Specifically, as the thermo-optic lens heats up, the resistance increases more in the center, causing the thermo-optic lens to "self-flatten". Thus more thermo-optic power is required to tune across the second half of the dispersion range than the first. To mitigate the lens distortion, the widths of the heating elements of the thermo-optic lens may be pre-weighted by adding a relatively small percentage of the square of the parabolic width distribution. However, it is preferable to utilize a heating element material (metal) with less resistance sensitivity to temperature change.

To design a TDC in accordance with the present invention, the values of $D_0$, $\Delta f_{FSR}$, $\Delta f_{GDBW}$, and $\Delta f_{TBW}$ must first be chosen. Equations (2) and (4) above, may then be used to determine the values of b and I such that the lens will operate within allowable temperatures. Then Equation (3) above may be used to determine a and Equation (1) above to determine M.

Figure 5A:
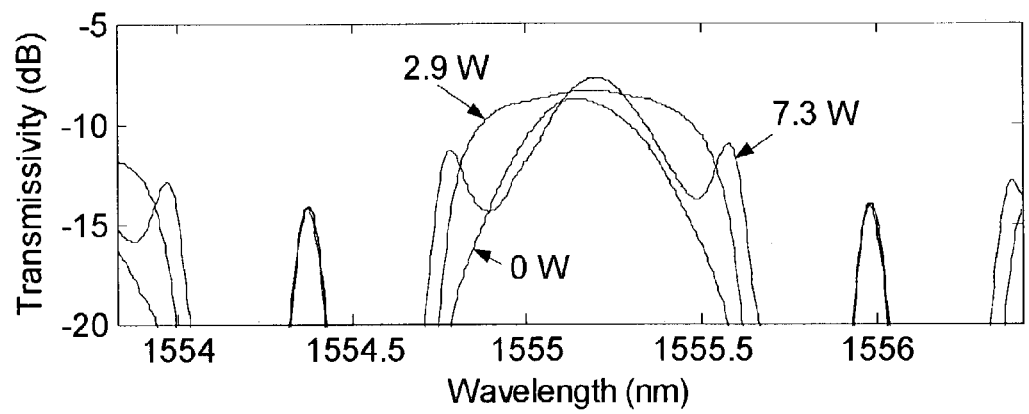
FIG. 5a graphically depicts the measured transmissivity versus wavelength of the tunable dispersion compensator of FIG. 1 for three different powers of the thermo-optic lens.
Figure 5B:
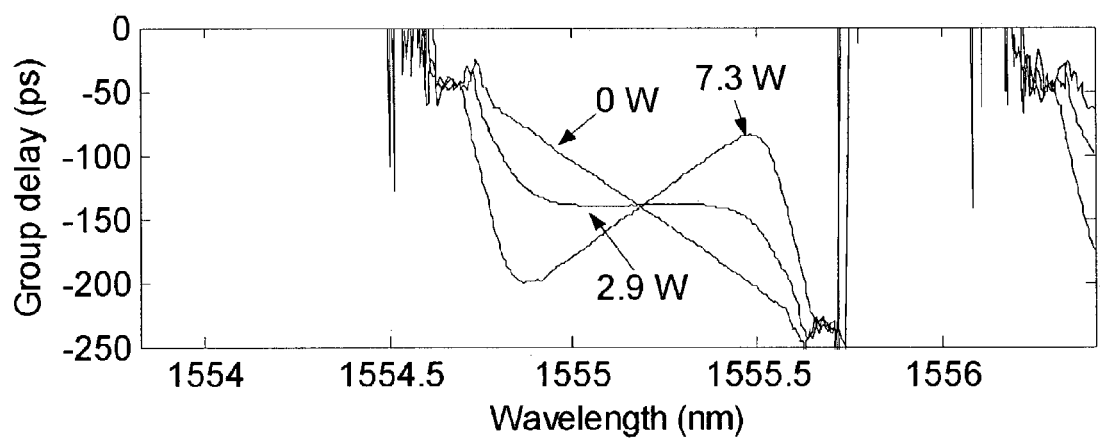
FIG. 5b graphically depicts the measured group delay versus wavelength of the tunable dispersion compensator of FIG. 1 for three different powers of the thermo-optic lens.

FIG. 5a graphically depicts the measured transmissivity versus wavelength for three different powers, 0 W, 2.9 W, and 7.3 W, for the thermo-optic lens 150 of the TDC 100. FIG. 5b graphically depicts the measured group delay versus wavelength for the three different powers, 0 W, 2.9 W, and 7.3 W, of FIG. 5a. The mean chromatic dispersions at these power levels are −205 ps/nm, 0 ps/nm, and +202 ps/nm, respectively. Because of the lens self-flattening, the power to tune from 0 to +200 ps/nm is 50% higher than that required to tune from −200 ps/nm to 0. The transmissivity bandwidth is >40 GHz (limited at the +200 ps/nm tuning condition), and the linear group delay bandwidth is >48 GHz (limited at the 0 ps/nm tuning condition). The three noise-filter MZI's were adjusted to maximize the transmissivity of the TDC passband under measurement.

Figure 6:
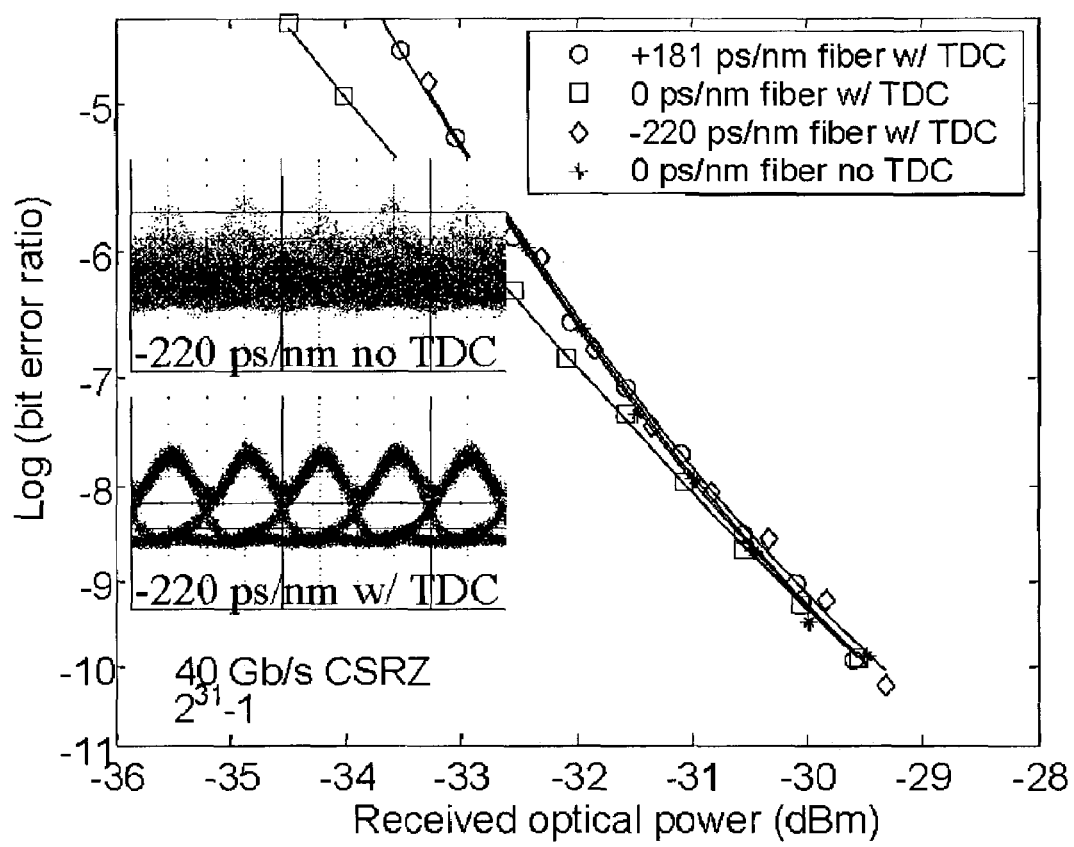
FIG. 6 graphically depicts the measured bit-error ratios for three dispersion values of 40 Gb/s CSRZ data propagated through the tunable dispersion compensator of FIG. 1.

In an experiment, 40 Gb/s carrier-suppressed return-to-zero (CSRZ) data at 193.350 THz was propagated through fiber spools having dispersion values of +181 ps/nm, 0, and −220 ps/nm and then through the TDC 100. The voltage to the thermo-optic lens 150 was adjusted accordingly to compensate for the dispersions. FIG. 6 graphically depicts the measured bit-error ratios (BERs) for the three dispersion values of the 40 Gb/s CSRZ data versus the received optical power. As evident from the measured bit-error ratios (BERs) shown in FIG. 6, the TDC 100 readily compensates up to −220 ps/nm of dispersion without penalty. The insets of FIG. 6 graphically depict the corresponding eye diagrams for the 40 Gb/s CSRZ data when propagated through a fiber spool comprising −220 ps/nm dispersion with no compensation by the TDC 100 (upper eye) and with compensation by the TDC 100 (lower eye). The tuning response of the TDC 100 was noted by the inventor to be in the range of 2 ms.

Figure 7:
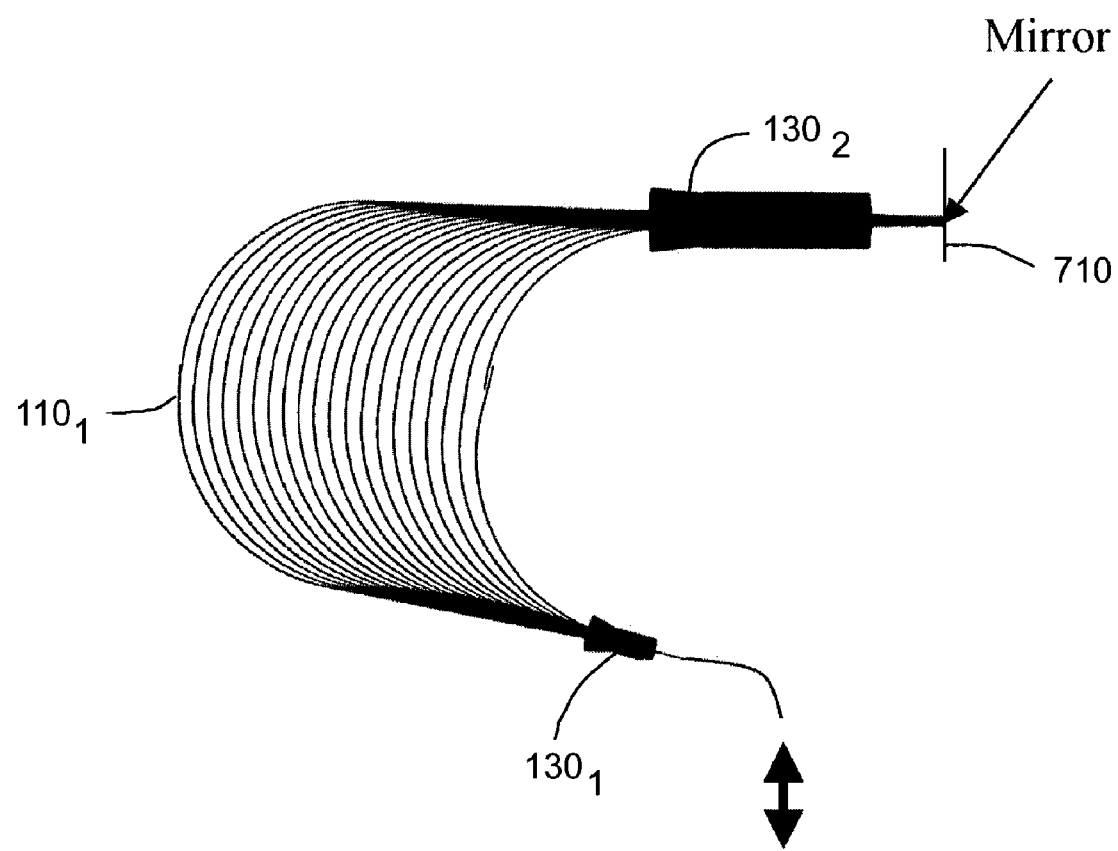
FIG. 7 depicts an alternate embodiment of a tunable dispersion compensator in accordance with the present invention.

FIG. 7 depicts an alternate embodiment of a TDC in accordance with the present invention. In the TDC 700 of FIG. 7, the second waveguide grating router 110$_2$ of FIG. 1 is replaced with a mirror 710. The TDC 700 of FIG. 7 comprises a waveguide grating router 110$_1$, a tunable lens comprising a parabolic refractive index distribution (illustratively a thermo-optic lens) 150, and the mirror 710. As in FIG. 1, the waveguide grating router 110$_1$ comprises a plurality of waveguides of increasing path lengths and a first and second star coupler 130$_1$, 130$_2$.

Because a TDC of the present invention, such as the TDC 100 of FIG. 1, is symmetric about the center, the TDC 700 of FIG. 7 is configured to comprise only one waveguide grating router 110$_1$ with the mirror 710 positioned after the thermo-optic lens 150 In the TDC 700 of FIG. 7, an input optical signal from the waveguide grating 110$_1$ propagates through the thermo-optic lens 150 and is reflected back through the thermo-optic lens 150 toward the waveguide grating router 110$_1$. With respect to the operation of the waveguide grating router 110$_1$, and the thermo-optic lens 150, the operation and function of the TDC 700 of FIG. 7 is substantially similar to the TDC 100 of FIG. 1. In such an embodiment of the present invention, such as the TDC 700 of FIG. 7, the mirror may be a polished facet on the end of a waveguide chip where the TDC is formed, with a reflective coating on the facet. As in the TDC 100 of FIG. 1, the TDC 700 of FIG. 7 may also further comprise a CPS (not shown) and a tunable filter (not shown).

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A thermo-optic lens, comprising:
    a plurality of parallel heating elements having substantially constant center-to-center spacing and respective dimensions varying from the outermost heating elements to the innermost heating elements; and
    at least two conductive elements for providing a potential across said heating elements;

wherein the dimensions of said heating elements are varied such that a parabolic temperature distribution is generated within said thermo-optic lens;

wherein each of said plurality of heating elements are formed at a small angle with respect to an intended optical beam axis within said thermo-optic lens such that refractive index ripples generated within said thermo-optic lens are reduced and a lens strength of said thermo-optic lens is negligibly affected.

2. The thermo-optic lens of claim 1, wherein the dimensions of said heating elements vary uniformly and symmetrically.

3. The thermo-optic lens of claim 1, wherein each of said heating elements has a substantially equal length and a width that increases from the outermost heating elements to the innermost heating elements.

4. A thermo-optic lens, comprising:

a plurality of substantially parallel heating elements having substantially constant center-to-center spacing and respective dimensions varying from the outermost heating elements to the innermost heating elements; and at least two conductive elements for providing a potential across said heating elements;

wherein the dimensions of said heating elements are varied such that a parabolic temperature distribution is generated within said thermo-optic lens;

wherein each of said plurality of heating elements are formed at a small angle with respect to an intended optical beam axis within said thermo-optic lens such that refractive index ripples generated within said thermo-optic lens are reduced and a lens strength of said thermo-optic lens is negligibly affected.

5. The thermo-optic lens of claim 4, wherein the dimensions of said heating elements vary uniformly and symmetrically.

6. The thermo-optic lens of claim 4, wherein each of said heating elements has a substantially equal length and a width that increases from the outermost heating elements to the innermost heating elements.

7. The thermo-optic lens of claim 4, wherein each of said heating elements has a substantially equal length and a width that decreases from the outermost heating elements to the innermost heating elements.

8. The thermo-optic lens of claim 4, wherein each of said heating elements has a substantially equal width and a length that decreases from the outermost heating elements to the innermost heating elements.

9. The thermo-optic lens of claim 4, wherein each of said heating elements has a substantially equal width and a length that increases from the outermost heating elements to the innermost heating elements.

10. The thermo-optic lens of claim 4, further comprising at least one conductive element located transverse and in electrical contact with each of said plurality of heating elements for maintaining a constant potential along the cross section of the thermo-optic lens.

* * * * *